United States Patent [19]

Takeuchi et al.

[11] Patent Number: 4,776,417
[45] Date of Patent: Oct. 11, 1988

[54] VEHICLE WITH RADIATOR

[75] Inventors: Tsutomu Takeuchi; Masami Yanagishita, both of Asaka; Takanori Ohkuma, Siki; Seiji Watanabe, Niiza; Hironori Sakuma, Asaka, all of Japan

[73] Assignee: Honda Giken Kogyo Kabushiki Kaisha, Tokyo, Japan

[21] Appl. No.: 925,722

[22] Filed: Oct. 30, 1986

[30] Foreign Application Priority Data

Oct. 30, 1985 [JP] Japan .......................... 60-167039[U]
Oct. 30, 1985 [JP] Japan .......................... 60-167040[U]
Oct. 30, 1985 [JP] Japan .......................... 60-167042[U]

[51] Int. Cl.⁴ .................................................. B60K 11/04
[52] U.S. Cl. ..................................... 180/68.4; 180/311
[58] Field of Search ................ 180/68.4, 311, 312, 180/68.6, 68.1

[56] References Cited

U.S. PATENT DOCUMENTS

| | | | |
|---|---|---|---|
| 4,535,866 | 8/1985 | Shiga | 180/68.4 X |
| 4,535,869 | 8/1985 | Tsutsumikashi et al. | 180/311 |
| 4,579,184 | 4/1986 | Hiramoto | 180/68.4 |
| 4,614,249 | 9/1986 | Yamanaka | 180/312 |
| 4,667,758 | 5/1987 | Tamura | 180/68.4 |

FOREIGN PATENT DOCUMENTS 2174655 11/1986 United Kingdom ............... 180/68.4

*Primary Examiner*—John J. Love
*Assistant Examiner*—Michael Mar
*Attorney, Agent, or Firm*—Bucknam and Archer

[57] ABSTRACT

A radiator is laterally mounted between a pair of right and left frames arranged parallel to each other. The radiator has an upper tank and a lower tank and is mounted onto the frames by means of pins and brackets, the pins going through orifices in the brackets. No particular fitting work is required. The number of the fastening elements for mounting the radiator is reduced and the assembly may be carried out more easily because the radiator may be mounted from the outside of the frames. Further, there are provided two upper and bottom discontinuous spaces formed by a shroud which surrounds the outside of the radiator, and heat generated when the engine is idle, may be dissipated.

4 Claims, 5 Drawing Sheets

VEHICLE WITH RADIATOR

The present invention relates to radiators of vehicles and more specifically to vehicles such as four-wheeled buggies provided with a water-cooled engine, in which the radiator is mounted laterally between a pair of right and left frames arranged parallel to each other. Still more specifically the invention relates to a fastening construction of a radiator shroud which is adapted to guide cooling air, and channel it from the atmosphere to the front portion of the radiator.

DESCRIPTION OF THE PRIOR ART

It is well known that in vehicles having a water-cooled engine and a pair of right and left frames arranged parallel to each other, such as four-wheeled buggies, a radiator is laterally disposed and is mounted between the parallel frames, with at least the four corners of the radiator being respectively bolted to the frames in such a manner that the radiator can absorb vibrations. The radiator has an inlet for injecting coolant to the interior of the radiator, the inlet being located at either the right or the left side. A radiator cap is secured onto the inlet, and therefore the radiator cap protrudes outside from the portion of the radiator fastening to the frame, so that taking the radiator cap on and off must be done from the outside of the frame. Further, the operation of mounting the radiator onto the frame must be carried out from the front side of the vehicle because the radiator cap may interfere with the mounting operation. It is also well known to employ a shroud fixed to the outside of the radiator in order to improve the cooling efficiency of the radiator. The shroud extends forwardly of the radiator and performs the function of guiding the cooling air from the atmosphere to the front portion of the radiator.

In the operation of fastening the radiator, many bolts are required and this is time consuming particularly in four-wheeled buggies. Further, this operation presents difficulties because the radiator fastening portions are located in the interior of the frame from both the front side and the side of the frame. Since the radiator cap is disposed outside of the radiator, during the operation of filling the radiator with the coolant, the cap must be taken off from the outside of the frame. However, since the vehicle side portion is usually covered with a fender, it must be detached everytime coolant is introduced into the radiator. Further, since the shroud fixed to the outside of the radiator usually has a box configuration surrounding the radiator, heat generated from the radiator remains closed in the box, particularly during the time when the vehicle is in parking condition and the engine is idle.

DESCRIPTION OF THE INVENTION

An object of the present invention is to reduce the number of bolts required to mount the radiator on the frame of the vehicle and to improve the mounting operation.

Another object of the present invention is to position the radiator cap in the preferred place on the radiator so that the fastening operation may be easily carried out.

Still another object is to provide a shroud for the radiator.

The crux of the present invention resides in providing fastening means on each of the four corners of the upper and bottom tanks of the radiator which is laterally disposed between a pair of right and left frames arranged parallel to each other. The fastening means on the upper tank are connected to separate fastening elements which are connected to the frame. During the operation of mounting the radiator on the frame, at first the bottom fastening means on the bottom tank are connected to the frame, and then the upper tank of the radiator is fixed to the frame through separate fastening elements, so that the radiator is just put on the frame. Therefore, only two fastening portions on the radiator tank are required so that the operation may be simplified and the number of parts required is reduced.

Fastening means are provided on each side of the radiator upper tank and the inlet for introducing a coolant and a radiator cap are placed therebetween, so that when the radiator cap is located in the center of the frame, it is possible to take the cap on and off from the front of the frame. With the construction according to the present invention, it is not necessary to detach the fender which is fixed to the frame when this operation is carried out.

The shroud surrounding the radiator has a pair of right and left panels extending forwardly of the radiator and there are formed discontinuous spaces both in the upper and bottom portions between the right and left panels so that heat from the radiator is diffused through both the upper and bottom spaces and the heat does not accumulate in the shroud even when the engine is idle.

BRIEF DESCRIPTION OF THE DRAWINGS:

The invention is further illustrated by reference to the drawings of which:

FIG. 4 shows a partially schematic side view of a frame and FIG. 5 illustrates the shroud.

In the description hereinbelow, the terms "upper" and "bottom" indicate the parts of a vehicle on the ground and the terms "forward" and "inner side" show the vehicle running direction and the central portion of the radiator respectively.

Figure 1:
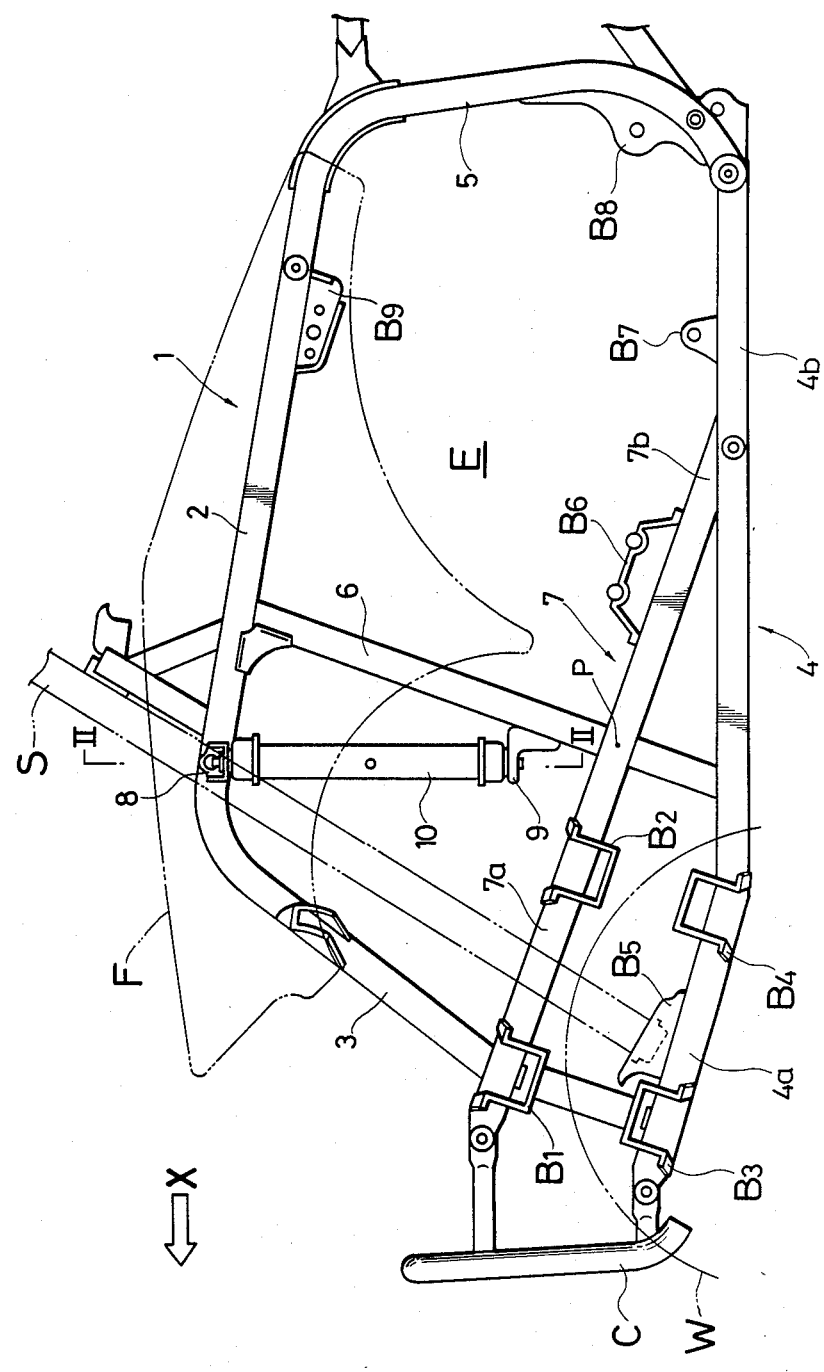
FIG. 1 illustrates a partially schematic side view of a frame according to the invention.
Figure 2:
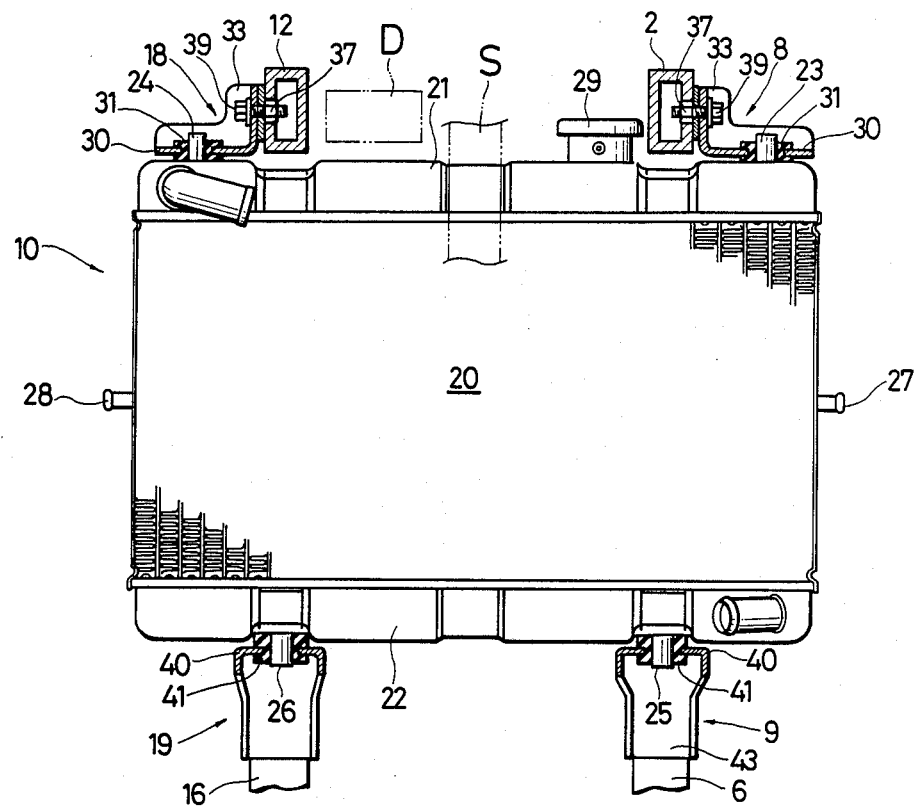
FIG. 2 illustrates the partially schematic sectional view according to the line II—II in FIG. 1.
Figure 3:
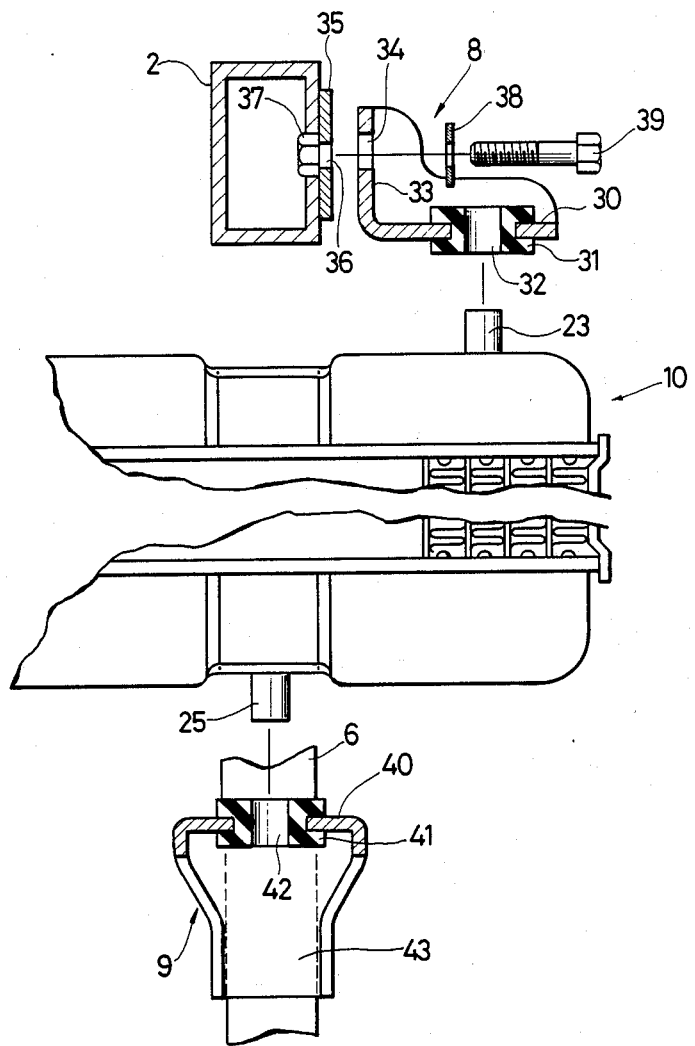
FIG. 3 illustrates the assembly operation.

The embodiment of FIGS. 1-3 is adapted to a four-wheeled buggy. FIG. 1 shows a partially schematic side view of the body frame for a four-wheeled buggy which comprises a loop construction and can mount a front wheel suspension, an engine, etc. The Arrow X is in a forward direction. The body frame has a pair of right and left symmetrical loop frames with an essentially quadrilateral configuration, that is, there are provided a left side loop frame 1 shown in FIG. 1 and a right side loop frame which is symmetrical and parallel to the left frame (not shown in the drawing). The right and left frames are connected by a plurality of cross-members which form a three-dimensional body frame. The loop frame construction is described in detail in U.S. Ser. No. 916,232 filed Oct. 7, 1986 now U.S. Pat. No. 4,735,275.

The symbol F in FIG. 1 in a dotted line shows a fender covering the body frame. The left side loop frame 1 has pipe 2 at the upper side, a front down pipe 3 which is the front side, a lower pipe 4, which is the lower side and the rear down pipe 5 which is the back side all of which form a first loop body frame of quadrilateral configuration. This frame can be constructed by four separate pipes by welding connection or by a single continuous pipe which is formed by bending. A center down pipe 6 is vertically disposed between the main pipe 2 and the lower pipe 4 in order to improve the strength of the loop body frame. A reinforcing pipe 7 is disposed diagonally between the front down pipe 3 and the lower pipe 4 in order to connect them to each other and further to cross the center down pipe 6 at the point P. The reinforcing pipe 7 forms a second loop construction by the combination of the main pipe 2, the upper portion of the front down pipe 3 and the rear portion 4b of the lower pipe 4. Each of these pipes has a quadrilateral configuration in cross-section, but pipes with a circular configuration or another configuration may be used.

A pair of brackets $B_1$, $B_2$ are fixed on the forward portion of the reinforcing pipe 7 which is the suspension supporting portion 7a from the crossing point P with the center down pipe 6. Another pair of brackets B, B are fixed on a suspension supporting portion 4a which is opposite to the above forward portion of the reinforcing pipe 7. Each end portion of the upper and lower wishbone arms (not shown) is pivotally mounted on the brackets $B_1$, $B_2$, $B_3$, $B_4$. A wheel, W is mounted on the ends of the wishbone arms. The wishbone arms are described in U.S. Ser. No. 916,232 filed Oct. 7, 1986 now U.S. Pat. No. 4,735,275.

A carrier C is fixed at the front end of the suspension supporting portion 7a of the reinforcing pipe 7 and also to the front end of the suspension supporting portion 4a of the lower pipe 4. Further, a steering shaft S is mounted on the bracket B5 which is fixed to the suspension supporting portion 4a of the lower pipe 4. The symbol E designates the engine room and is the space which is surrounded by the center down pipe 6, the power unit supporting portion 7b of the reinforcing pipe from the crossing point P, the rear down pipe 5 and the main pipe 2 which form a second loop construction, that is, an engine (not shown in the drawing) is mounted on a pair of brackets B6, B7, each of which is fixed to the power unit supporting portion 7b of the reinforcing pipe 7 and the power unit supporting portion 4b of the lower pipe and also on a pair of brackets B8, B9, each of which is fixed to the rear down pipe 5 and the main pipe 2. Therefore, in this embodiment, a pair of loop constructions respectively mount a front suspension and an engine. A bracket 8 is fixed on the front portion of the main pipe 2 forwardly of the juncture portion of the center down pipe 6 and the main pipe 2.

On the vertical line going through the bracket 8 there is positioned the front end of the bracket 9 which is fixed to the side of the center down pipe 6 and which extends forwardly with the bent portion in side view and which is positioned close to the crossing point P of the center down pipe 6. A radiator 10 is disposed and mounted between the two brackets 8 and 9. The bracket 8 may be located on the center down pipe 6. Further, the radiator 10 may be mounted direcly on the body frame by passing the pins provided in the bottom tank into orifices made in the body frame.

FIG. 2 shows the radiator itself and the mounting construction in detail. The radiator 10 is constituted by a main heat exchange portion 20 with a plurality of fins and a pair of upper and bottom tanks 21, 22. Four fitting pins are vertically built on each of the right and left sides of the tanks. Additionally there are provided a pair of right and left pins 27, 28 which are used to assemble a shroud to the radiator 10. An inlet for introducing the coolant is provided between the pins 23, 24 and is sealed by a radiator cap 29, which is disposed between the main pipes 2 and 12. In this embodiment, the radiator cap 29 is positioned close to the interior of the main pipe 2 in order to protect it from the outside.

The radiator 10 is laterally disposed in a position of crossing the pair of right and left loop body frames and is mounted on a pair of right and left brackets 8, 18, which connect with the upper tank of the radiator 10. Pins 23, 24 are respectively inserted into the brackets which are fitted to a pair of main pipes 2, 12. The bottom tank 22 is mounted on each of the brackets 9, 19 welded to the pair of left and right center down pipe 6, 16 through the pins 25, 26. The right center down pipe 16 is not shown in FIG. 1.

The mounting construction of the upper tank on the main pipe 2 with reference to the left side frame including the left bracket 8 is shown in FIGS. 2 and 3. The bracket 8 has an L-shape configuration in the front view which has both an horizontal plain surface 30 and a vertical plain surface 33. The surface 30 has a rubber bush fixed to the orifice of the bracket which has pin hole 32 for inserting the pin 23 and the vertical surface 33 has a slot 34 for passing a fitting bolt 39 through. A plate 35 with a welded nut 37 is welded on the outer surface of the main pipe 2, in which the nut 37 is located within the main pipe 2, where an opening 36 is provided for passing the fitting bolt 39 through in line with the nut 37. The bracket 8 is fitted to the main frame 2 by bolt 39 which is passed through a washer 38, the opening 34, the opening 36 in order and is screwed by nut 37. The upper right side of the radiator 10 is mounted on the right main pipe 12 in the same manner by pin 24 which is inserted in the bracket 18. Since each element on the right side is shown in the figure by the same reference numbers, a detailed description is not necessary.

The upper side of the radiator 10 may be mounted on the main right and left pipes 2, 12 through each bracket 8, 18 by means of right and left bolts.

The mounting construction of the bottom side of the radiator 10 will be described in connection with the left side frame in FIGS. 1, 2 and 3. The bracket 9 is formed essentially with the configuration of the letter "L" in side view with an horizontal plain surface 40. A rubber bush 41 with a pin hole 42 is fitted into the orifice of the horizontal plain surface 40. The pin 25 projecting from the bottom side of the radiator is inserted into the pin hole 42. The vertical portion 43 of the bracket 9 is fixed on the center down pipe 6 by welding or with bolts, etc. Therefore, the bottom side of the radiator is mounted on the center down pipe 6 by means of the pin 25 and the bracket 9. The bottom right side of the radiator 10 is mounted in the same manner as the left side and therefore, a detailed description is not required. Therefore, as shown in FIG. 2, the upper tank 21 is mounted on the pair of left and right main pipe 2, 12 by means of the left and right pins 23, 24 inserted into each of the right and left brackets 18, 8. The bottom tank 22 is mounted on the pair of right and left center down pipes 6, 16 by means of the right and left pin 26, 25 which are inserted into each of the right and left brackets 19, 9. Therefore, the radiator 10 is mounted on the main pipes 2, 12 and the center down pipes 6, 16 in a manner to absorb vibrations. The symbol "D" in FIG. 2 shows an air inlet duct for an engine and "S" shows a steering shaft.

The assembly of each pin to the corresponding frame is shown in FIG. 3, but specifically only the left side of the radiator 10 is shown. The pin 25 is inserted into the pinhole 42 of the rubber bush 41 fixed to the bracket 9 so that the bottom tank of the radiator 10 is mounted on the center downpipe 6, so that the total weight of the radiator 10 is almost supported by only the center downpipe 6. The pin 23 is inserted into the pin hole 32 of the rubber bush 31 fixed to the bracket 8 and then the vertical surface 33 is attached to the main pipe 2 by means of the bolt 39 which is screwed to the welded nut 37 through the washer 38 and the plate 35, whereby the upper tank of the radiator 10 is firmly mounted on the main pipe 2. The pins 23, 24 of the radiator upper tank are simply inserted into the brackets 8, 18 so that errors in the machining may be absorbed, that is, under such conditions that the radiator 10 is mounted on the main pipe 2, the hanging load is neither added to the radiator upper tank nor to the main pipes 2, 12. Additionally, it is possible to mount the radiator on the main pipes 2, 12 without any problem even in the case of errors in the manufacture of all pins 23, 24, the brackets 8, 18 and the main pipes 2, 12. The radiator 10 may be rapidly fastened to the frame with only a pair of the right and left bolts, because it may be easily inserted from the outside of the frame and the assembly may be completed before fitting the fender F. The on-off operation of the radiator cap 29 may also be easily carried out from the upper front side of the radiator 10, whereby at that time it is not necessary to take off the fender F covering the side of the body frame from the body frame. Since the radiator cap 29 is disposed between the pins 23, 24, which may be positioned as close to the outside of the radiator as possible, it is possible to widen the distance of the supporting points between the pins 23, 24.

Figure 4:
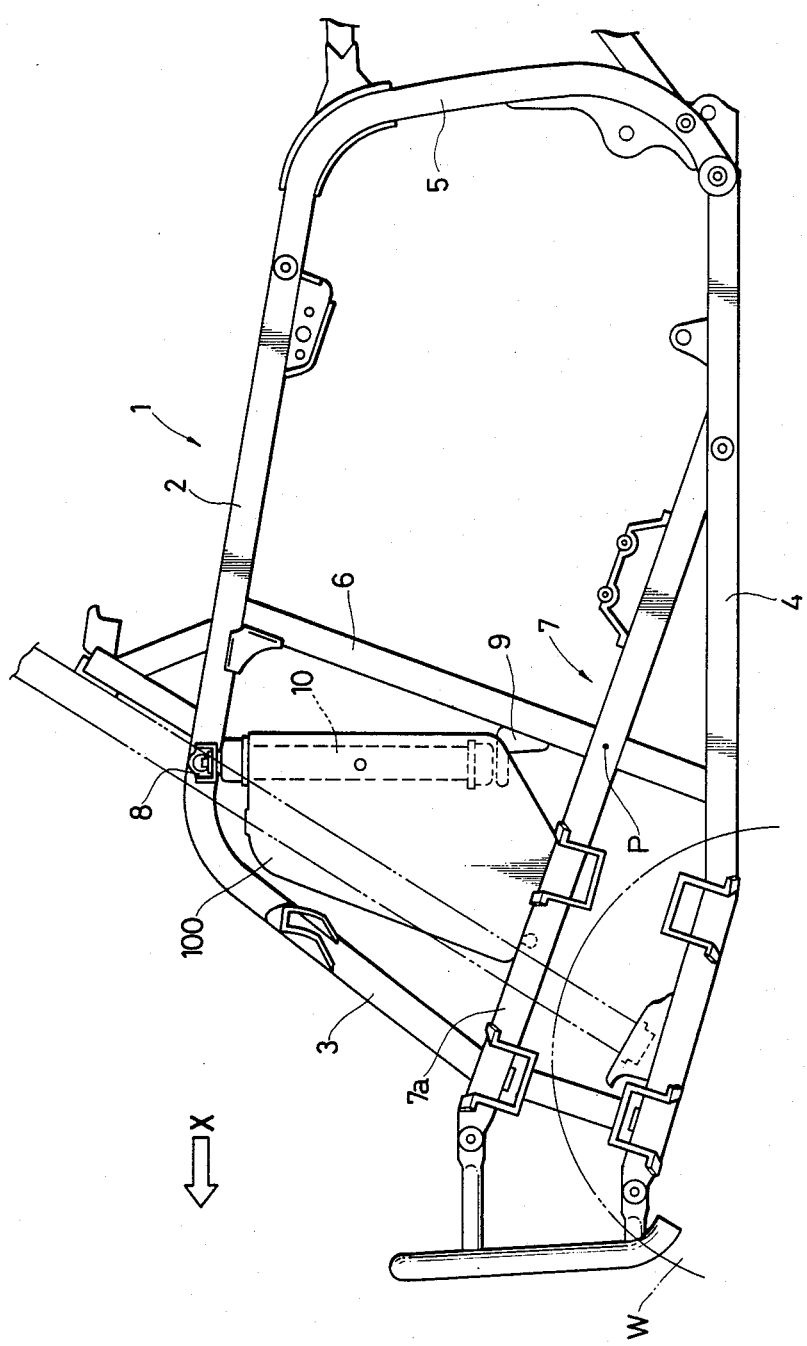
FIG. 4 and FIG. 5 show a second embodiment, and specifically
Figure 5:
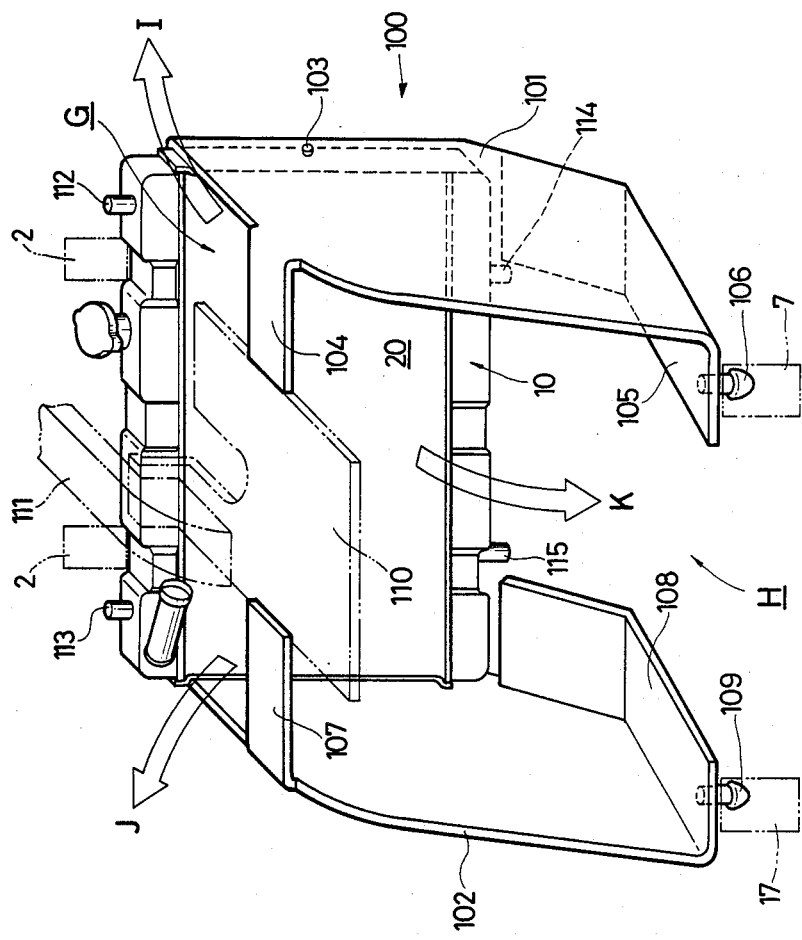

A second embodiment of the invention will be described according to FIGS. 4 to 5, in which there is shown a shroud to be fitted on the radiator. Since only one feature is different in this embodiment, the corresponding members except the shroud are designated by the same reference numerals or symbols. The radiator fitting construction is the same as the first embodiment, that is, the radiator is disposed and mounted between the bracket 8 which is provided on the front portion of the main pipe 2 and the bracket 9 which is provided on the lower portion of the center downpipe 6. A shroud 100 is fitted on the side of the radiator 10. FIG. 5 shows the outside view of the shroud 100 composed of a pair of left and right side panels 101, 102 each of which is forwardly projecting from the left and right side of the radiator 10.

The rear end of the left side panel 101 is fixed to the radiator 10 by a pin 103 built in the radiator side wall. There are formed an upper flange 104 on the upper part of the panel 101, which is integrally made with the panel 101 and which projects toward the center of the frame and a bottom flange 105 on the bottom portion of the panel 101, which is also integrally made with the panel 101 and which extends along with the reinforcing pipe 7 and which projects toward the center of the frame. A projecting pin 106 is integrally formed on the bottom flange 105 with an enlarged tip portion which is fixed to the reinforcing pipe 7 in order to absorb the vibrations between the pin 103 and the corresponding orifice in the side panel 101. The bottom flange 105 is effective to protect from rain, mud etc. which may be splashed by the front wheel W, as shown in FIG. 4. The right side panel 102 has a symmetrical configuration with respect to the left side panel 101, that is, it is fixed to the side of the radiator 10 by a pin and also has an upper flange 107 and a bottom flange 108, and is fixed to the right reinforcing pipe 17 by projecting pin 109 which is integrally made with the bottom flange 108.

As described above, the shroud 100 is provided only at the portion forwardly projecting from the radiator 10 and the pair of right and left side panels form an upper and bottom discontinuous space G and H in the center of the frame. In the space between the right and left flange 104 and 107 there are disposed a separate plate 110 which extends from the front portion of the frame and an air intake duct 111 close to the radiator upper tank. Numerals 112, 113 designates pins provided on both sides of the radiator upper tank and are used to mount the radiator on the pair of left and right main pipes 2, 12 through the brackets 8, 18 shown in FIGS. 4 and 2. Numerals 114, 115 are pins provided on both sides of the radiator bottom tank and they are also used to mount the radiator on the left and right center downpipes 6 and 16 through the brackets shown in FIGS. 4 and 2.

The function of the shroud 100 in this embodiment will be described particularly with respect to the function in addition to the basic function of cooling air when the vehicle is running. When the vehicle is in the parking state with the engine idle, no cooling air goes through, heated generated in the radiator may be dissipated through both the upper and bottom spaces of the shroud 100 as indicated by the arrows I, J, K, so that heat may not accumulate. Additionally, since the shroud 100 is divided into a pair of right and left side panels, it may be easily assembled in different locations and it is not necessary to take into account the deformation of the side panel. The shroud may be made as an integrally molded configuration with a pair of large upper and bottom orifices as a heat diffusion space.

What is claimed is:

1. In a saddle riding type vehicle comprising a body frame having a right frame and a left frame arranged parallel to each other and being connected by a plurality of cross members including reinforcing pipes (7, 17), a radiator mounted laterally on said body frame, said right and left frame each having a bottom part and an upper part, the radiator having an upper tank and a bottom tank, said bottom tank having two corners, said upper tank having two corners, a radiator mounting apparatus comprising:

first fastening means (23, 24, 25, 26) provided on the corners of said upper and bottom tanks and extending therefrom;

second fastening means (9, 19) fixed on the bottom parts of said right and left frames, said second fastening means being engageable with the first fastening means provided on the corners of said bottom tank;

brackets (8, 18) fastening the upper parts of said right and left frames to said first fastening means of said upper tank; and the radiator having a shroud, wherein said shroud is composed of a left panel (101) and a right panel (102), each of said left and right panels being fixed to said radiator by first pin means (103) built in each sidewall of the radiator, each of said left and right panels having a bottom flange (105, 108) and an upper flange (104, 107), second pin means (106, 109) projecting from each of said bottom flanges, said second pin means being fixedly attached to each of said reinforcing pipes (7, 17), said shroud forming upper and lower spaces whereby heat is dissipated and cooling air may be guided from the atmosphere to said radiator.

2. The radiator mounting apparatus according to claim 1 wherein said brackets have an "L" shape configuration with a horizontal and a vertical portion and said orifices are located in said horizontal portion.

3. The radiator mounting apparatus according to claim 1, wherein said upper tank has an inlet for introducing a coolant and a cap for closing said inlet.

4. The radiator mounting apparatus according to claim 3, wherein said radiator cap is disposed close to the inner side of said right frame or said left frame.

* * * * *